UNITED STATES PATENT OFFICE.

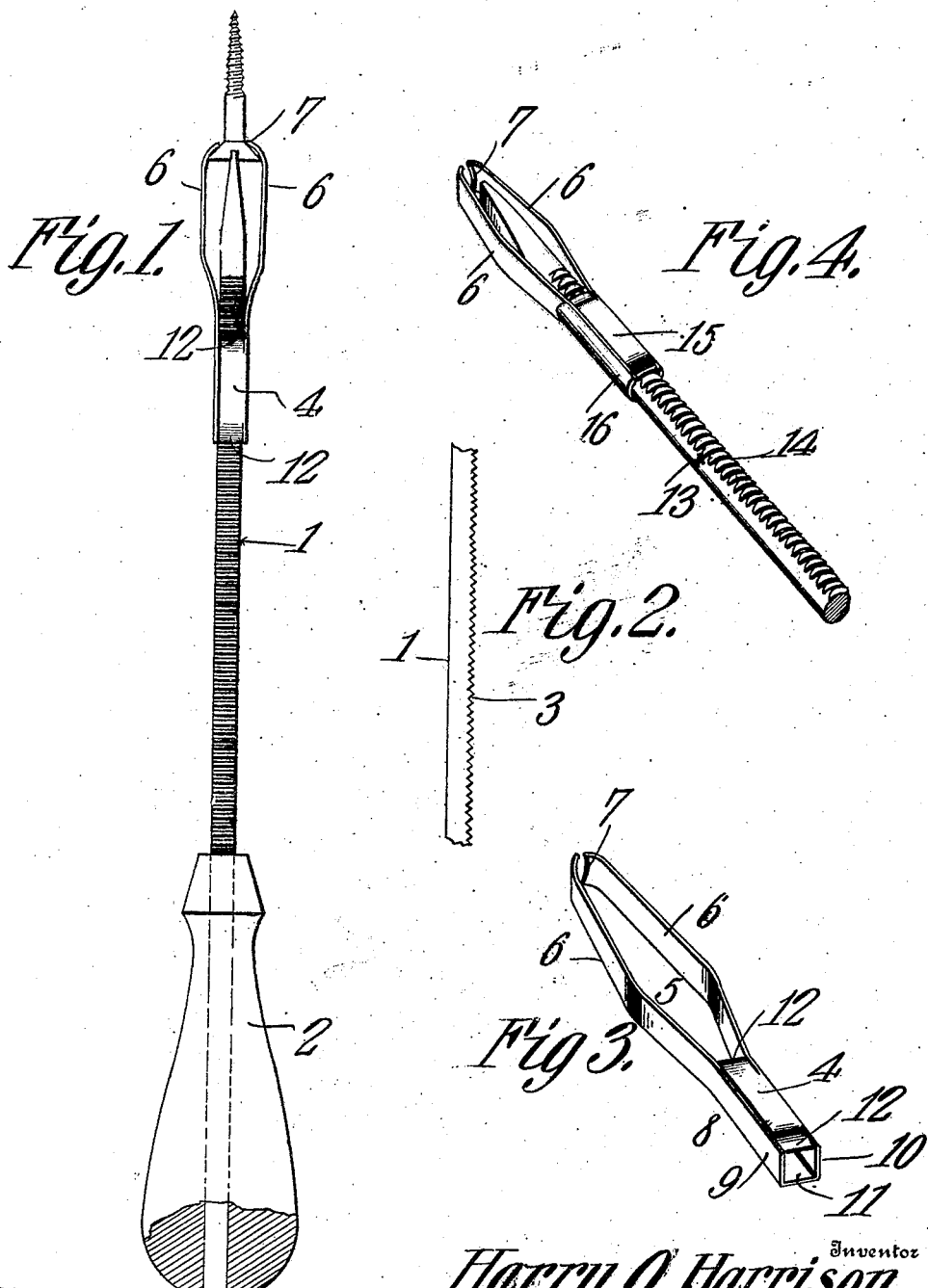

HARRY O. HARRISON, OF WICHITA, KANSAS.

SCREW-DRIVER.

No. 896,107.

Specification of Letters Patent.

Patented Aug. 18, 1908.

Application filed August 8, 1907. Serial No. 387,695.

*To all whom it may concern:*

Be it known that I, HARRY O. HARRISON, a citizen of the United States, residing at Wichita, in the county of Sedgwick and State of Kansas, have invented a new and useful Screw-Driver, of which the following is a specification.

This invention relates to screw drivers.

The object of the invention is to provide a screw driver having a novel form of screw holder combined therewith whereby to adapt the implement for use in positions where an ordinary screw driver could not be used, the implement being so constructed that it will serve of itself positively to retain the screw holding attachment in any adjusted position, and without the employment of clamping screws or the like such as are ordinarily employed.

A further object is to provide a novel form of screw-holding attachment for screw drivers which may readily be adapted for use in connection with a screw driver having either a polygonal or cylindrical shank.

With the above and other objects in view as will appear as the nature of the invention is better understood, the same consists in the novel construction of a screw driver and a screw-holding attachment therefor, as will be hereinafter fully described and claimed.

In the accompanying drawings forming a part of this specification, and in which like characters of reference indicate corresponding parts,—Figure 1 is a view in side elevation of one form of screw driver embodying the features of the present invention. Fig. 2 is a fragmentary detail view of a portion of the screw driver shown in Fig. 1. Fig. 3 is a perspective detail view of the screw-holding attachment shown in Fig. 1. Fig. 4 is a perspective view, partly in section showing a slightly modified form of screw driver shank and screw-holding attachment.

Referring to the drawings and to Figs. 1, 2 and 3 thereof, 1 designates the shank of a screw driver and 2 the handle thereof, the latter being of any preferred shape and being centrally pierced by the shank.

The shank is quadrangular in cross section and is provided on one of its faces with teeth 3 that are adapted to be engaged by a double acting detent 4 carried by the screw-holding attachment designated, generally, 5. This attachment is preferably made from a piece of resilient sheet metal, and is formed with arms 6 that are slightly outwardly bowed and have their terminals inturned and transversely dished, as at 7, in order to fit around the shank of a screw adjacent to its head. The arms 6 merge into a sleeve 8 that is rectangular in cross section to conform to the shape of the shank of the screw driver, and has two of its walls, 9 and 10, formed by continuations of the arms, the third wall, 11, being formed by bending the arms to the position shown, and the fourth wall, which constitutes the detent 4, formed by bending a length of the metal parallel with the wall 11. The terminals 12 of the detent are downturned, in order to engage with the teeth 3, and thus firmly hold the attachment in position, and to secure this result, the detent is separated for a short portion of its length at both ends from the wall 10 and wholly disconnected from the wall 9, as clearly shown in Fig. 3.

In the form of the invention shown in Fig. 4, the only difference is that the shank 13 is cylindrical in cross section and one side is provided with teeth 14 that are engaged by a detent 15 carried by a sleeve 16, which latter is cylindrical in cross section in order to conform to the shape of the shank.

It will be noted by reference to Fig. 1 that the teeth 3 extend from a point adjacent to the outer end of the shank to the handle, the object of this arrangement being to permit of the entire length of the shank being utilized as, when it wears down or becomes broken, it may be reground or dressed down to form a screw-engaging point, and this may be continued until the shank is only slightly longer than the attachment.

Owing to the fact that the screw-holding attachment may be slid freely upon the shank it will not be necessary to remove it should the screw driver be used in the ordinary manner; but should it be desired to attach it this may readily be accomplished. In using the implement with the improvements herein described the arms 6 are flexed laterally, the point of the screw driver is brought into the nick of the screw and the attachment is then slid rearwardly to cause the terminals 7 to engage with the head. To detach the screw driver from the screw it will only be necessary to draw upward or backward as the case may be.

The improvements herein defined are simple in character but will be found thoroughly efficient in use for the purposes designed and will result in added utility to the implement with which it is used.

What is claimed is:—

A screw holding attachment for screw drivers comprising a sleeve two walls of which are extended to provide screw engaging arms, the terminals of which are inturned and transversely dished, and a third wall wholly disconnected from the proximate wall along one edge and partly disconnected therefrom along the other edge, to provide a double acting detent.

In testimony that I claim the foregoing as my own, I have hereto affixed my signature in the presence of two witnesses.

HARRY O. HARRISON.

Witnesses:
WM. C. HERSHBERGER,
H. H. CARR.